US012707131B1

(12) United States Patent
Wu et al.

(10) Patent No.: US 12,707,131 B1
(45) Date of Patent: Aug. 11, 2026

(54) GENERATION OF MANIFESTS FOR IMAGE PRESENTATION DURING VIDEO PRESENTATION

(71) Applicant: Amazon Technologies, Inc., Seattle, WA (US)

(72) Inventors: Yongjun Wu, Bellevue, WA (US); Yang Yang, Issaquah, WA (US); Vasanthakumar Soundararajan, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 6 days.

(21) Appl. No.: 18/900,129

(22) Filed: Sep. 27, 2024

(51) Int. Cl.

| | |
|---|---|
| ***H04N 21/845*** | (2011.01) |
| ***H04N 21/472*** | (2011.01) |
| ***H04N 21/84*** | (2011.01) |
| ***H04N 21/854*** | (2011.01) |

(52) U.S. Cl.
CPC ... *H04N 21/8456* (2013.01); *H04N 21/47217* (2013.01); *H04N 21/84* (2013.01); *H04N 21/85406* (2013.01)

(58) Field of Classification Search
CPC ......... H04N 21/8456; H04N 21/47217; H04N 21/84; H04N 21/85406
See application file for complete search history.

(56) References Cited

U.S. PATENT DOCUMENTS

2014/0037264 A1* 2/2014 Jackson ........... H04N 21/47214 386/E5.052
2016/0337426 A1* 11/2016 Shribman ............. H04L 65/612
2019/0042908 A1* 2/2019 Garcia .................... G06N 3/006
2019/0069016 A1* 2/2019 Chung ............. H04N 21/23113
2021/0209829 A1* 7/2021 Ilola .......................... G06T 1/20
2024/0330392 A1* 10/2024 Hernandez-Mondragon .............. G06F 16/9554

* cited by examiner

*Primary Examiner* — Annan Q Shang
(74) *Attorney, Agent, or Firm* — Kilpatrick Townsend & Stockton LLP

(57) ABSTRACT

Techniques for generating manifests for image presentation during video presentation are described herein. In an example, a system generates an input to an artificial intelligence (AI) model on a set of frames of video content. The system receives, based on the input, an output of the AI model indicating a set of images corresponding to the set of frames that are to be presented during a scrubbing operation associated with a presentation of the video content. The output further indicates durations for individual images of the set of images. A first image of the set of images is to be presented for a first duration that is different from a second duration that a second image is to be presented. The system generates a manifest including the video content, an indication of the set of images, and the durations. The system stores the manifest in a storage location.

20 Claims, 10 Drawing Sheets

GENERATION OF MANIFESTS FOR IMAGE PRESENTATION DURING VIDEO PRESENTATION

BACKGROUND

Over the past few years, content streaming has become increasingly widespread. Video streaming is one example. In many streaming environments, video may be sent from a source to a recipient via an intermediary, such as an intermediary video streaming service. One common instance in which this may occur relates to television and movie streaming. For example, a user may request presentation of video content at a user device, and the video content can be displayed at the user device in response to the request.

BRIEF DESCRIPTION OF THE DRAWINGS

Various embodiments in accordance with the present disclosure will be described with reference to the drawings, in which.

DETAILED DESCRIPTION

Figure 1:
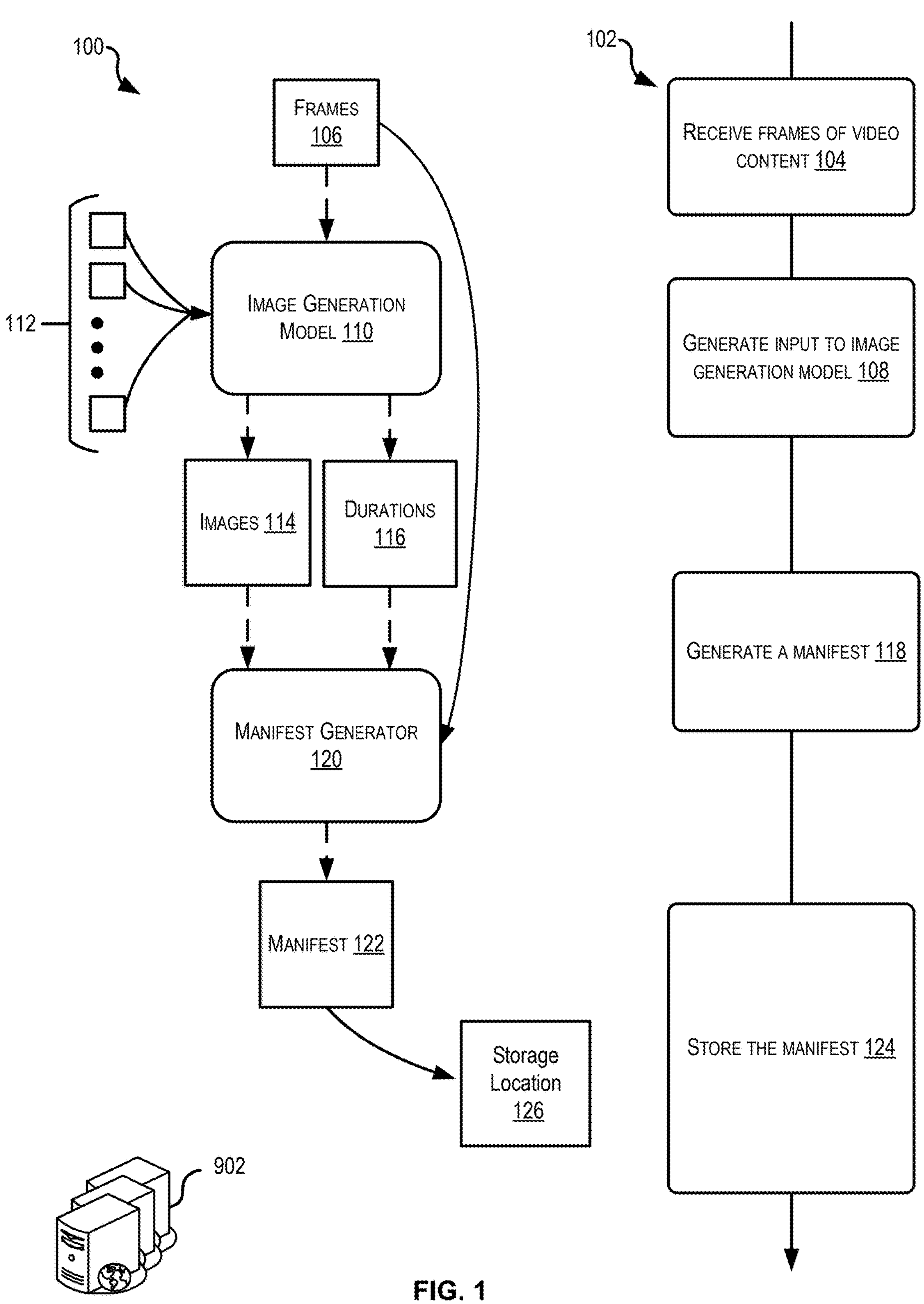
FIG. 1 illustrates an example block diagram and associated flowchart showing a process for implementing techniques relating to generating manifests for image presentation during video content presentation, according to at least one example.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Embodiments of the present disclosure are directed to, among other things, techniques to improve image presentation during video presentation. During presentation, a user may interact with the video to scrub forward or backward in the video to find where to play the video from. During this scrubbing operation, images associated with the video are presented that indicate the video content in proximity to the scrubbing. In an example, a computer system can use an artificial intelligence model to select the images that are to be presented based on the video content. For instance, the artificial intelligence model may not select frames of the video that are all black to be an image that is presented during scrubbing. The artificial intelligence model can also determine durations for each of the images. For instance, the artificial intelligence model may determine a first image is to be presented for five seconds of the video content during the scrubbing and that a second image is to be presented for fifteen seconds of the video content during the scrubbing. As such, the first image represents the five seconds of the video content and the second image represents the fifteen seconds of the video content. Upon determining the images and the durations for presentation during scrubbing, the computer system can generate a manifest that includes the video content, an indication of the images, and the durations. The computer system may store the manifest so that the manifest can be retrieved upon a user device requesting presentation of the video content.

In an example, a user device may request presentation of the video content and receive the manifest from the computer system. As such, image presentation information (e.g., the images, a location of the images, corresponding durations for the images, etc.) is communicated in-band with video content information (e.g., the frames of a movie or television show and durations of the frames). The user device can then receive a user input via a user interface of the user device to begin a scrubbing operation during presentation of the video content. The user device determines a timestamp of the video content associated with the user input, and, using the manifest, the user device can determine an image that is to be presented based on the timestamp. The user device then retrieves the image and causes a presentation of the image in connection with the scrubbing operation.

To illustrate, consider an example of a video streaming service that provides movies on demand. The video streaming service can include a movie about soccer on demand. The video streaming service can generate a manifest that includes the video content for the movie, as well as image presentation information for when a user scrubs through the video content. The video streaming service can apply an artificial intelligence model to frames of the soccer movie to generate images that are to be presented during scrubbing. For instance, the artificial intelligence model may output a first image showing a huddle of soccer players. The artificial intelligence model can indicate that this first image is to be shown for a scrubbing operation between timestamps of zero seconds and one minute of the soccer movie. The first image showing the huddle is an image frame from the first one minute of the soccer movie. The artificial intelligence model may be trained to select images based on various parameters (e.g., images that are interesting, images that represent the duration well, images that are devoid of certain types of content (e.g., nudity, violence, etc.), images that match the dialogue, images that prioritize people over objects, etc.). In addition, the artificial intelligence model may output a second image showing soccer players running on a field. The artificial intelligence model can indicate that this second image is to be shown for a scrubbing operation between timestamps of one minute and one minute and thirty seconds of the soccer movie. That is, the first image has a duration of one minute and the second image has a duration of thirty seconds. The video streaming service can include an indication of the images and the durations in the manifest that includes the video content. For instance, the images may be stored as JPEG images in an MP4 file and the manifest can indicate the location of the MP4 file and the byte ranges in the MP4 file that are associated with each of the images.

Upon a user device requesting presentation of the soccer movie using the video streaming service, the video streaming service sends the manifest to the user device. The user device can then receive a user input of a user dragging a timeline feature via a user interface, initiating a beginning of a scrubbing operation. The video streaming service can determine that the beginning of the scrubbing operation is at a timestamp of thirty seconds in the soccer movie. So, the video streaming service determines that the first image of the huddle of soccer players is to be presented. Using the manifest, the video streaming service retrieves the first image and causes the first image to be presented at the user interface of the user device in connection with the scrubbing operation.

Embodiments of the present disclosure provide various technological advantages over a conventional computer system. For example, conventional techniques may involve out-of-band communication of image presentation information. As such, the communication between the user device and the server can require significant network bandwidth. In comparison, the embodiments provide in-band communication of image presentation information that involves less communication with a server. So, the embodiments provide conservation of network bandwidth. In addition, conventional techniques may involve constant duration image presentation for image presentation, meaning that the images for presentation are generated at a predefined interval (e.g., ten seconds) of the video content regardless of what is being shown in the video content. As such, all-black images or other images irrelevant to the content of the video may be generated. In comparison, the embodiments provide variable duration images that are generated at undefined intervals based on the content of the video. These images may be more informative as to the content at a particular timestamp, resulting in improved user experience when presented. Further, the image determination and retrieval can be performed in real-time (e.g., as soon as a user input is received, where real-time accounts for any network and/or processing latency) during the video stream. This system can, also in near real-time (e.g., within a few milliseconds, a few seconds, or a few minutes due to processing latency), present a retrieved image. As such, the image presentation occurs automatically in near-real time such that playback of the video stream need not be interrupted or, if delayed, it would be delayed by a relatively short period of time (e.g., a few milliseconds, a few seconds, or a few minutes due to the processing latency). As such, the overall experience of the user is improved.

Turning now to the figures, FIG. 1 illustrates an example block diagram and associated flowchart showing a process for implementing techniques relating to generating manifests for image presentation during video content presentation, according to at least one example.

The diagram 100 depicts devices, objects, and the like that correspond to the process 102. The process 102 can be performed by any suitable combination of hardware and/or software, as described herein.

Figure 2:
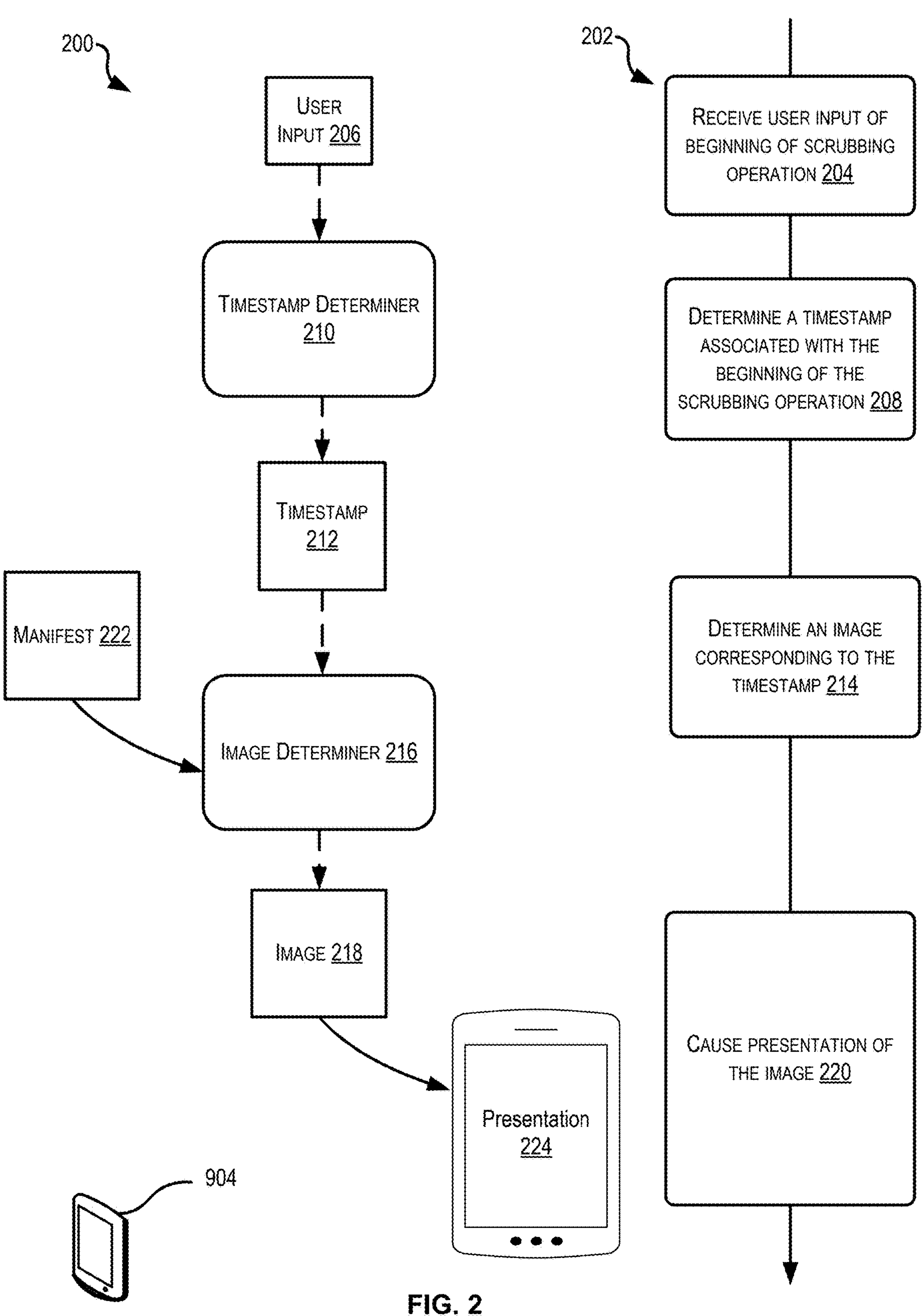
FIG. 2 illustrates an example block diagram and associated flowchart showing a process for implementing techniques relating to using manifests for image presentation during video content presentation, according to at least one example.
Figure 8:
FIG. 8 illustrates an example flowchart showing a process for implementing techniques relating to generating manifests for image presentation during video presentation, according to at least one example.
Figure 8:
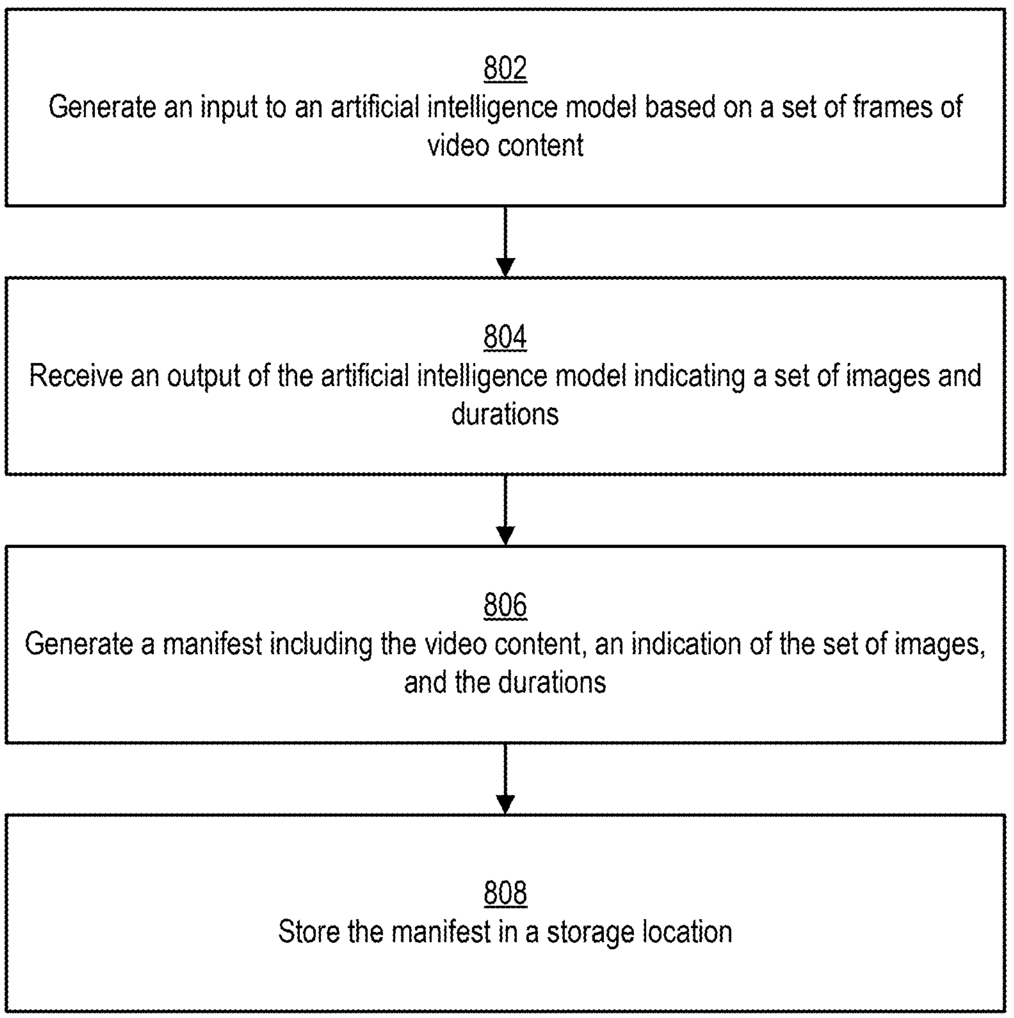

FIGS. 1, 2, and 8 illustrate example flow diagrams showing respective processes 102, 202, and 800, as described herein. The processes 102, 202, and 800, are illustrated as logical flow diagrams, each operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be omitted or combined in any order and/or in parallel to implement the processes.

Additionally, some, any, or all of the processes may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable storage medium, for example, in the form of a computer program comprising a plurality of instructions executable by one or more processors. The computer-readable storage medium is non-transitory.

A video presentation engine 910 (FIG. 9) embodied in a computer system 902 (FIG. 9) and/or within a user device 904 (FIG. 9) may perform the process 102. Thus, while the description below is from the perspective of the computer system 902, the user device 904 may also perform the process 102 or portions of the process 102.

The process 102 may begin at block 104 by the computer system 902 receiving frames 106 of video content. The frames 106 represent the video content as images. The video content may be on-demand, meaning that it can be stored by the computer system 902 or another server and requested to be played at a user device. Alternatively, the video content may be live stream content, which, as used herein, refers to scenarios in which video content of an event (e.g., a video game) may be transmitted to recipients, and at least part of the video content may be played while the event is still occurring (e.g., while the video game is still being played by the players), albeit with some a small amount of latency between the time that video content is captured and the time that the video is eventually played to viewers. The live streaming may involve a delay between the time when the content was initially generated by a content source and/or received by the computer system 902 and the time when the processed content was sent from the computer system 902 and/or received by a user device. Optimally, this delay is reduced or minimized and can be within a few milliseconds or a few seconds. So, a presentation of video content may involve presenting live stream video content or presenting a playback of on-demand video content.

The process 102 may continue at block 108 by the computer system 902 generating an input to an image generation model 110. The input can be based on the frames 106, meaning that the frames 106 themselves may be the input or a different representation of the frames 106 may be the input. The image generation model 110 may be an artificial intelligence model trained to generate images 114 from frames 106. So, the image generation model 110 can receive the frames 106 of the video content as an input and provide the images 114 as an output. The images 114 may be images representing the most interesting content of the video content. The images 114 may be selected at non-standard intervals of the frames 106. For example, a first image may show an outdoor scene, a second image may show a sport scene, a third image may show a cooking scene, etc. The image generation model 110 may select the images 114 based on various parameters (e.g., images that are interesting, images that represent the duration well, images that are devoid of certain types of content (e.g., nudity, violence, etc.), images that match the dialogue, images that prioritize people over objects, images that are devoid of content (e.g., black frames), etc.

The image generation model 110 can also output indications of durations 116 for each of the images 114. The durations 116 correspond to how much of the video content each of the images 114 represents during a scrubbing operation associated with presentation of the video content relative to a timeline of the video content. For example, a first image may have a duration of five seconds and may be associated with a beginning of the video content. So, for a scrubbing operation associated with the first five seconds of the video content, the first image is to be presented. The durations 116 for other images may be associated with different lengths (e.g., ten seconds, twenty seconds, one minute, etc.), such that the durations 116 are not the same for each image.

The image generation model 110 may be trained using training data 112 to generate the images 114 and the durations 116. The training data 112 may be frames of video content with labels indicating for which frames images are to be generated and the durations for presenting the images. The image generation model 110 generates images and corresponding durations for the training data 112 and then compares the images and durations to the labels. Parameters of the image generation model 110 can be updated until a loss function between the generated images and durations and the labels is minimized.

The process 102 may continue at block 118 by the computer system 902 generating a manifest 122. The manifest 122 may be a hypertext transfer protocol (HTTP) live streaming (HLS) manifest or a dynamic adaptive streaming over HTTP (DASH) manifest. The manifest 122 includes all the information necessary for a user device to download and present a given piece of content. A manifest generator 120 can receive the video content (e.g., the frames 106), the images 114, and the durations 116 and generate the manifest 122. So, the manifest 122 can include the video content, an indication of the images 114, and the durations 116.

In some examples, the manifest 122 can include the video content, targeted content, and interactive content. Each type of content may be associated with a period, or portion, of the manifest 122. A period represents a window of time in which content is expected to be presented. The period may reference an absolute point in time (e.g., for live stream content), or the period may indicate a duration for the content items contained within it. The periods can be played in the sequence that they appear in the manifest 122. In an example, a first portion of the manifest 122 is associated with the video content, a second portion of the manifest 122 is associated with interactive content that is to be presented in association with the video content, and a third portion of the manifest 122 is associated with targeted content that is to be presented in association with the video content. The images 114 can be associated with the video content, and there can also be images for presentation during scrubbing operations for the interactive content and images for presentation during scrubbing operations for the targeted content. The images for the interactive content and the targeted content may similarly be determined by the image generation model 110.

The process 102 can continue at block 124 by the computer system 902 storing the manifest 122. The computer system 902 can store the manifest 122 in a storage location 126 so that the manifest 122 may be retrieved when the video content associated with the manifest 122 is requested for presentation. The storage location 126 may be local to or remote from the computer system 902.

In an example, at some point in time, the computer system 902 may re-input the frames 106 to the image generation model 110 and determine an updated set of images that are to be presented during the scrubbing operation. In addition, the computer system 902 can determine updated durations for presenting the updated set of images. So, the computer system 902 can generate an updated manifest including the video content, an update indication of the updated set of images, and the update durations.

FIG. 2 illustrates an example block diagram and associated flowchart showing a process for implementing techniques relating to using manifests for image presentation during video content presentation, according to at least one example. The video presentation engine 910 (FIG. 9) embodied in the computer system 902 (FIG. 9) and/or within the user device 904 (FIG. 9) may perform the process 202. Thus, while the description below is from the perspective of the user device 904, the computer system 902 may also perform the process 202 or portions of the process 202.

The process 202 may begin at block 204 by the user device 904 receiving a user input 206 of a beginning of a scrubbing operation. A scrubbing operation corresponds to navigating through video content by dragging a slider or timeline bar back and forth to dynamically seek to any time position within video content. So, the user input 206 can be received via a user interface of the user device 904 and can correspond to an initiation of the scrubbing operation during presentation of video content at the user device 904.

The process 202 may continue at block 208 by the user device 904 determining a timestamp 212 associated with the beginning of the scrubbing operation. Each position of a timeline of the video content can be associated with a timestamp. So, a timestamp determiner 210 of the user device 904 can determine a point on the timeline that corresponds to the user input 206 and correlate the point to the timestamp 212 for the beginning of the scrubbing operation.

The process 202 may continue at block 214 by the user device 904 determining an image 218 corresponding to the timestamp 212. An image determiner 216 can receive the timestamp 212 and a manifest 222 associated with the video content. The manifest 222 can include the video content, an indication of images that are to be presented in associated with a scrubbing operation during presentation of the video content, and durations for presenting the images. The image determiner 216 may generate a mapping between the timeline of the video content and the images based on the durations. For instance, a first image may be mapped to the first ten seconds of the timeline based on its duration being ten seconds, a second image may be mapped to the next five seconds of the timeline based on its duration being five seconds, etc. The image determiner 216 can determine a point within the timeline to which the timestamp 212 of the user input 206 corresponds. Based on the mapping, the image determiner 216 can then determine that the point corresponds to the image 218.

The process 202 may continue at block 220 by the user device 904 causing presentation 224 of the image 218. As such, the image 218 is presented in connection with the scrubbing operation during presentation of the video content. The presentation 224 may be presented on a display of the user device 904 in real-time relative to the user input 206 being received.

Figure 3:
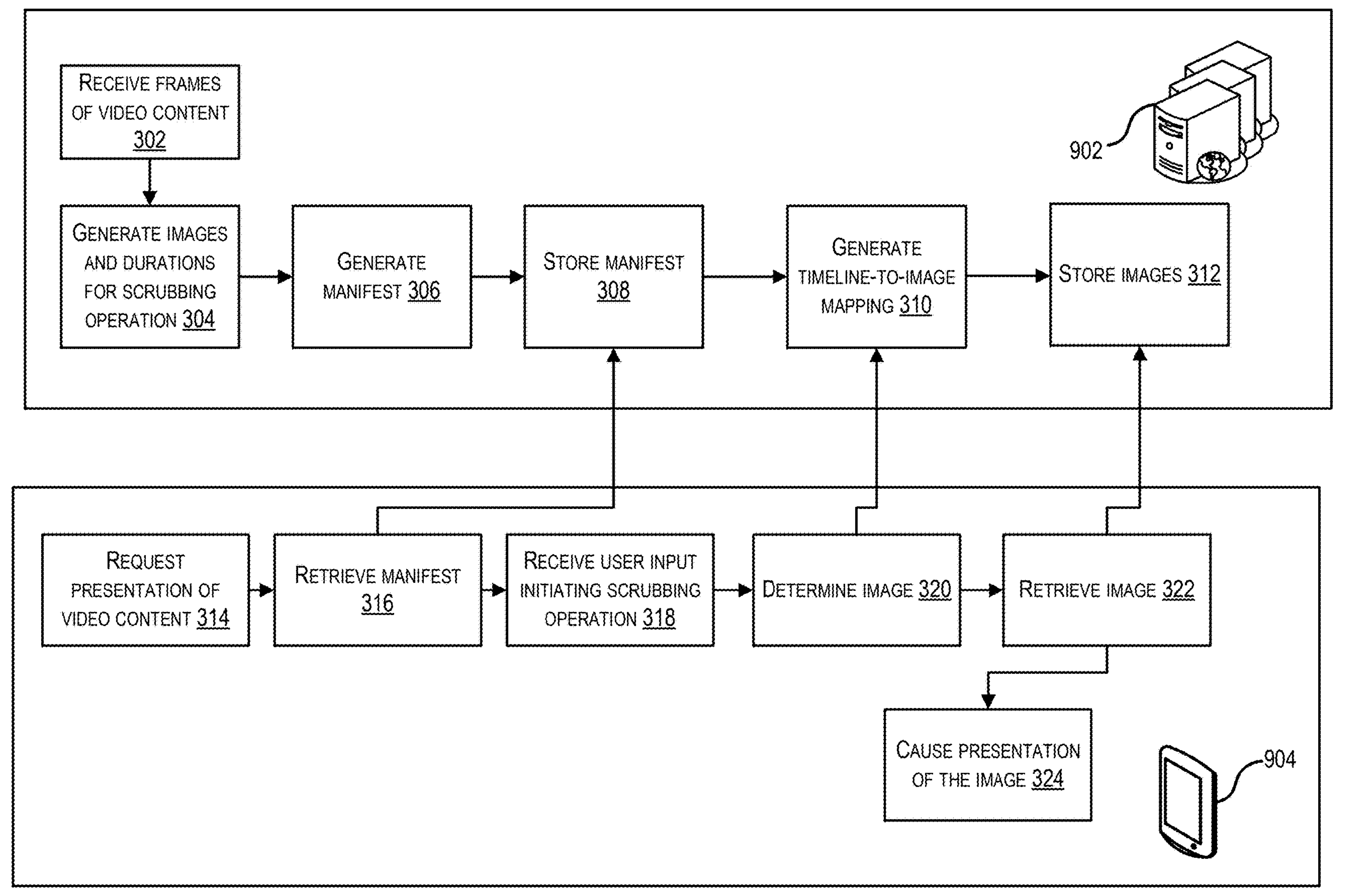
FIG. 3 illustrates an example flowchart of generating and using manifests to present images during video presentation, according to at least one example.

FIG. 3 illustrates an example flowchart of generating and using manifests to present images during video presentation, according to at least one example. The video presentation engine 910 (FIG. 9) embodied in the computer system 902 (FIG. 9) and/or the user device 904 (FIG. 9) may perform the process 900. Thus, while the description describes certain portions of the process from the perspectives of the computer system 902 and user device 904, the computer system 902 and the user device 904 may perform other portions of the process.

At block 302, the computer system 902 receives frames (e.g., frames 106 in FIG. 1) of video content. The computer system 902 can generate images (e.g., images 114 in FIG. 1) and durations (e.g., durations 116 in FIG. 1) for a scrubbing operation. That is, the images and the durations can be images that are to be presented for a duration in association with a scrubbing operation during presentation of the video content. The durations for the images can be different. The computer system 902 may input the frames into an artificial intelligence model (e.g., image generation model 110 in FIG. 1) to generate the images and the durations.

At block 306, the computer system 902 can generate a manifest (e.g., manifest 122 in FIG. 1) that includes the video content, an indication of the images, and the durations for the images. The manifest is usable to play the video content and to determine and present the images during a scrubbing operation. The computer system 902 can then store the manifest at block 308. The computer system 902 can store the manifest in a storage location (e.g., storage location 126 in FIG. 1). At block 310, the computer system 902 can generate a timeline-to-image mapping. The timeline-to-image mapping maps a timeline of the video content to presentations of the images. The computer system 902 can generate the timeline-to-image mapping based on the durations for the images. At block 312, the computer system 902 can store the images. The images may be stored as individual JPEG images, as tiles of JPEG images in an overall JPEG image, as an MP4 file that includes JPEG images for each of the images, or as a BIF file that includes JPEG images for each of the images.

In an example, at block 314, the user device 904 can request presentation of the video content. The request can be to initiate presentation of the video content at the user device 904. The user device 904 can then retrieve the manifest at block 316. The user device 904 can retrieve the manifest from the storage location. At block 318, the user device 904 can receive a user input (e.g., user input 206 in FIG. 2) initiating a scrubbing operation. The user device 904 can receive the user input via a user interface of the user device 904. The user device 904 can then determine an image (e.g., image 218 in FIG. 2) that is to be presented in association with the scrubbing operation at block 320. To determine the image, the user device 904 can determine a timestamp of the video content associated with the beginning of the scrubbing operation. The user device 904 may then use the timeline-to-image mapping. So, the user device 904 can determine a point on the timeline of the video content that corresponds to the timestamp and then the image that corresponds to the point based on the timeline-to-image mapping. Upon determining the image, the user device 904 can retrieve the image at block 322. The user device 904 can access the stored images to retrieve the image. At block 324, the user device 903 can cause a presentation (e.g., presentation 224 in FIG. 2) of the image. The image is presented in connection with the scrubbing operation.

Figure 4:
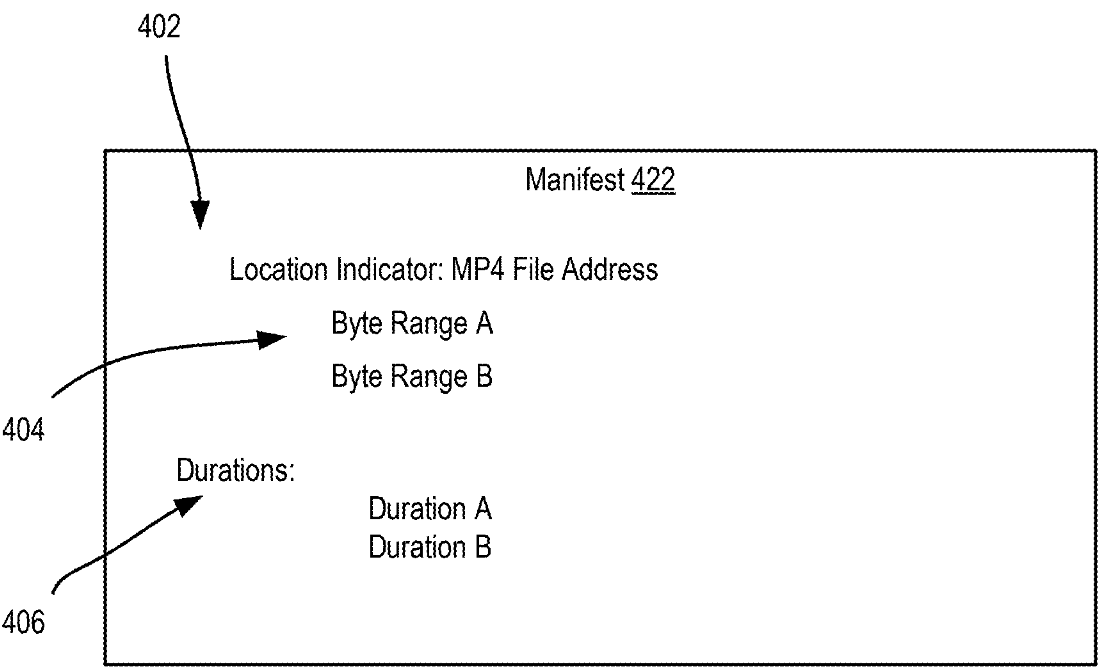
FIG. 4 illustrates an example of a manifest for presenting images stored in an MP4 file, according to at least one example.

FIG. 4 illustrates an example of a manifest 422 for presenting images stored in an MP4 file, according to at least one example. The manifest 422 is an example of the manifest 122 in FIG. 1 and the manifest 222 in FIG. 2. The manifest 422 corresponds to video content and includes the video content and information about images that are to be presented during a scrubbing operation during presentation of the video content.

In the example of FIG. 4, the images are stored in an MP4 file that includes JPEG images for each of the images. So, the manifest 422 includes an indication of a location 402 of the MP4 file. The indication of the location 402 may be an MP4 file address or uniform resource locator (URL), and can correspond to a storage location in which the MP4 file is stored.

In addition, the manifest 422 can include byte ranges 404 indicating a byte range of the MP4 file for each of the images. For instance, byte range A can correspond to a first image in the MP4 file and byte range B can correspond to a second image in the MP4 file. The manifest 422 also includes durations 406 indicating how much of the video content each image represents relative to the timeline of the video content. For instance, duration A can correspond to a length of time of the timeline that the first image represents for a scrubbing operation, and duration B can correspond to a length of time of the timeline that the second image represents for a scrubbing operation. Since duration A may be different than duration B, the durations 406 for each of the images can be specified in the manifest. Although not shown in FIG. 4, the manifest 422 may additionally indicate offsets between the durations 406 for the images.

So, when a user input is received at the user device 904 that initiates the beginning of the scrubbing operation, a timestamp of the video content associated with the beginning of the scrubbing operation is determined. Then, a point within the timeline corresponding to the timestamp is determined, and a mapping between the timeline and the images based on the durations can be used to determine that the point corresponds to a particular image (e.g., the first image). The MP4 file location and the byte range are then used to retrieve the image and cause a presentation of the image in connection with the scrubbing operation.

In an example, rather than the images being stored in an MP4 file that includes JPEG images for each of the images, the images may be stored in a BIF file that includes JPEG images for each of the images. In this case, the manifest can similarly indicate a location of the BIF file and byte ranges of the BIF file that correspond to each of the images. The BIF file location and the byte range for a particular image can be used to retrieve the image and cause a presentation of the image in connection with a scrubbing operation. The durations indicated by the manifest can include a total duration of the images in the BIF file, and the BIF file itself can specify the duration for each image. Or, the durations indicate the duration of each image in the BIF file when the manifest uses the byte range and offset to index the image.

Figure 5:
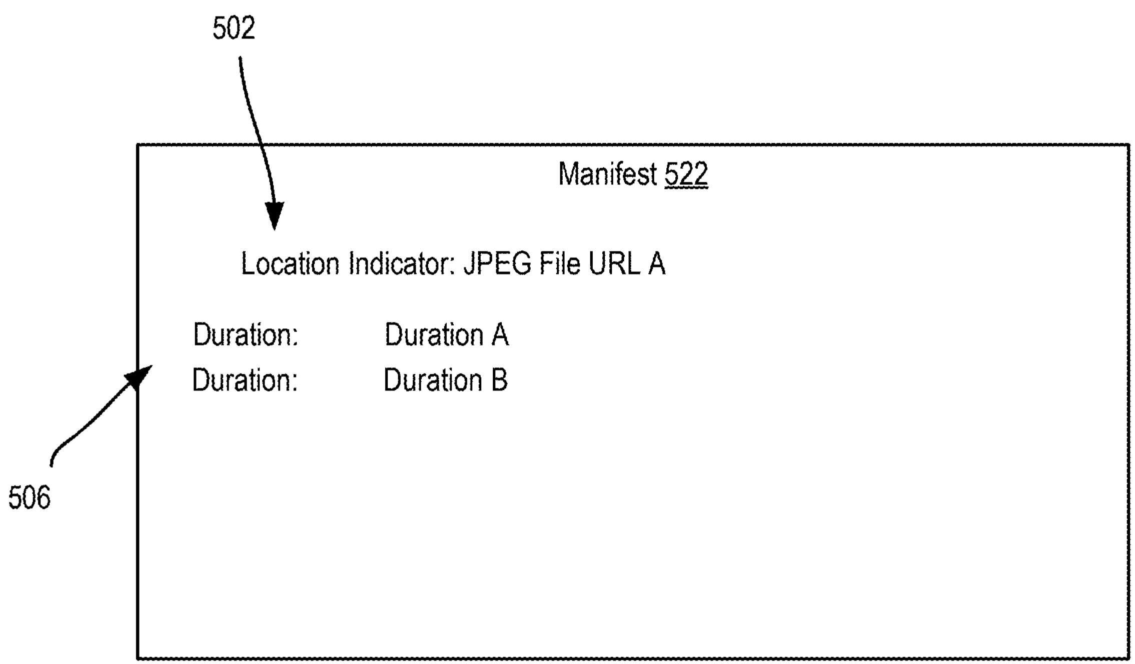
FIG. 5 illustrates an example of a manifest for presenting images stored in as JPEGs, according to at least one example.

FIG. 5 illustrates an example of a manifest 522 for presenting images stored in as JPEGs, according to at least one example. The manifest 522 is an example of the manifest 122 in FIG. 1 and the manifest 222 in FIG. 2. The manifest 522 corresponds to video content and includes the video content and information about images that are to be presented during a scrubbing operation during presentation of the video content.

In the example of FIG. 5, the images are stored as tiles of JPEG images in an overall JPEG image. So, the manifest 522 includes an indication of a location 502 of the tiles. The indication of the location 502 may be a file address or URL, and can correspond to a storage location in which the tiles are stored.

In addition, the manifest 522 can include durations 506 indicating how much of the video content each image (or tile) represents relative to the timeline of the video content. For instance, duration A can correspond to a length of time of the timeline that the first image represents for a scrubbing operation, and duration B can correspond to a length of time of the timeline that the second image represents for a scrubbing operation. Since duration A may be different than duration B, the durations 506 for each of the images can be specified in the manifest. Although not shown in FIG. 5, the manifest 522 may additionally indicate offsets between the durations 506 for the images.

So, when a user input is received at the user device 904 that initiates the beginning of the scrubbing operation, a timestamp of the video content associated with the beginning of the scrubbing operation is determined. Then, a point within the timeline corresponding to the timestamp is determined, and a mapping between the timeline and the tiles based on the durations can be used to determine that the point corresponds to a particular image (e.g., a first tile). The tile location is then used to retrieve the image and cause a presentation of the image in connection with the scrubbing operation.

In an example, rather than the images being stored as tiles, the images may be stored as individual JPEG images for each of the images. In this case, the manifest can indicate locations each of the JPEG images that correspond to each of the images. The locations for each of the JPEG images may be different. The JPEG image location for a particular image can be used to retrieve the image and cause a presentation of the image in connection with a scrubbing operation. In this case, the manifest can still indicate the durations 506 for each of the images.

Figure 6:
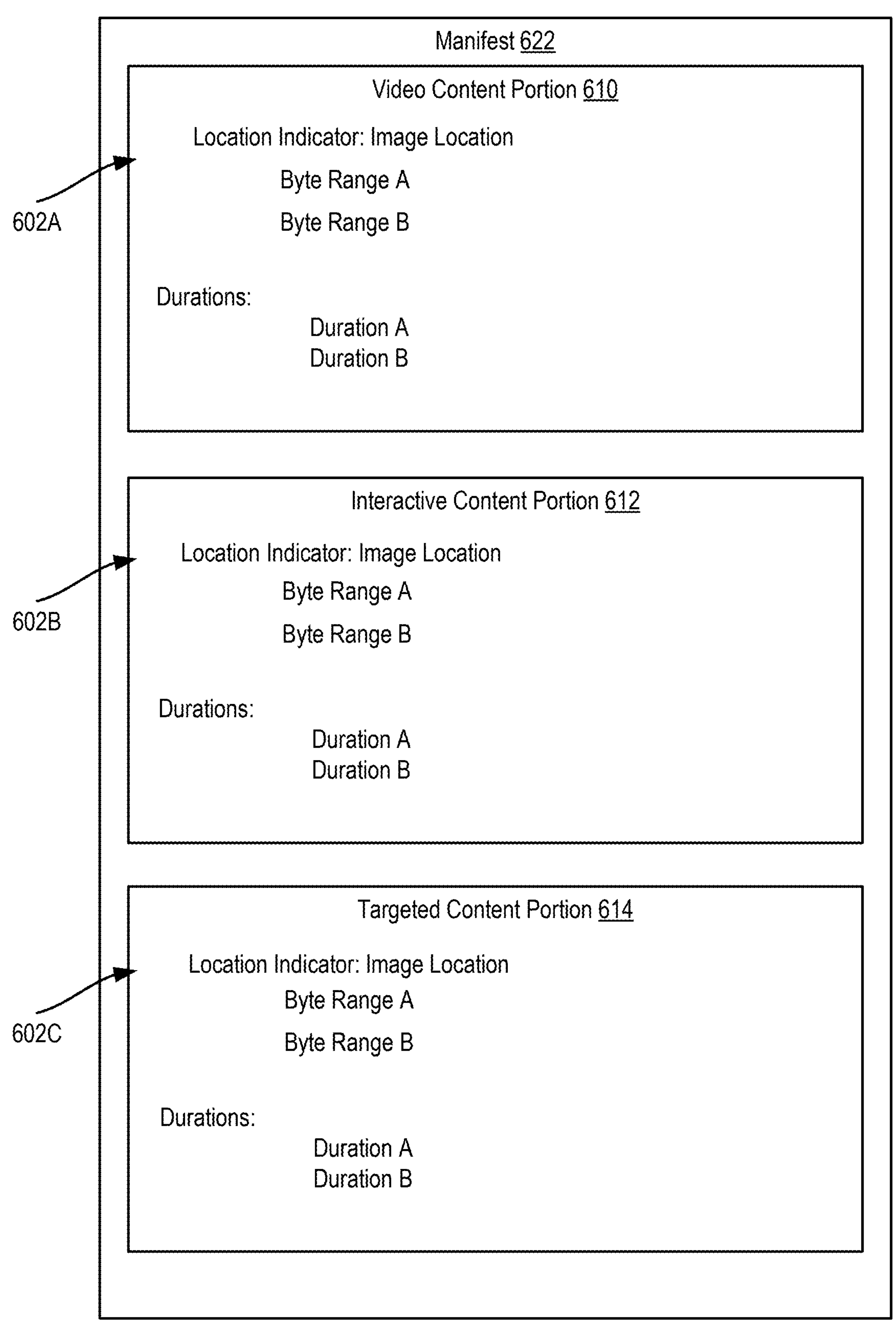
FIG. 6 illustrates an example of a manifest with multiple portions, according to at least one example.

FIG. 6 illustrates an example of a manifest 622 with multiple portions, according to at least one example. The manifest 622 is an example of the manifest 122 in FIG. 1 and the manifest 222 in FIG. 2. The manifest 622 corresponds to video content and includes the video content and information about images that are to be presented during a scrubbing operation during presentation of the video content.

As described in FIG. 1, the manifest 622 can include a video content portion 610 that is associated with presenting the video content, an interactive content portion 612 that is associated with interactive content that is to be presented in association with the video content, and a targeted content portion 614 that is associated with targeted content that is to be presented in association with the video content. Interactive content may be links or other interactive features that a user can interact with during presentation of the video content. Interacting with the interactive content may lead to skipping of a portion of the video content, an opening of a webpage, or another action. Targeted content relates to advertisements that are to be presented between segments of the video content.

In an example, each of the video content portion 610, the interactive content portion 612, and the targeted content portion 614 are associated with a set of images that are to be presented for scrubbing operations associated with the corresponding type of content. Location indicator 602A indicates a location from which the images for the video content portion 610 can be retrieved. Location indicator 602B indicates a location from which the images for the interactive content portion 612 can be retrieved, and location indicator 602C indicates a location from which the images for the targeted content portion 614 can be retrieved. Byte ranges for the images in the locations may also be indicated in the manifest 622, depending on a format in which the images are stored. The images for each of the portions may be presented for a variable duration, and each of the durations can also be indicated in the manifest 622. So, the manifest 622 can be used to present the video content, interactive content, and targeted content during presentation of the video content. The manifest 622 can also be used to present an image during a scrubbing operation associated with any of the video content, the interactive content, or the targeted content.

Figure 7:
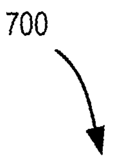
FIG. 7 illustrates an example of a timeline of video content and corresponding images for presentation, according to at least one example.
Figure 7:
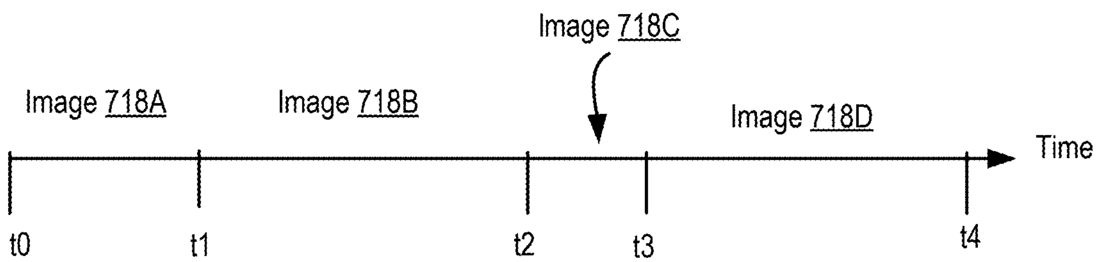

FIG. 7 illustrates an example of a timeline 700 of video content and corresponding images for presentation, according to at least one example. The timeline 700 may represent a first minute of the video content. For example, t0 may correspond to a timestamp of zero seconds for the video content, t1 may correspond to a timestamp of ten seconds for the video content, t2 may correspond to a timestamp of thirty-five seconds for the video content, t3 may correspond to a timestamp of forty seconds for the video content, and t4 may correspond to a timestamp of sixty seconds for the video content.

For a scrubbing operation during presentation of the video content, images related to the video content can be presented for various lengths of time relative to the timeline 700. For instance, image 718A can be presented for a scrubbing operation that begins at a timestamp between zero seconds and ten seconds, image 718B can be presented for a scrubbing operation that begins at a timestamp between ten seconds and thirty-five seconds, image 718C can be presented for a scrubbing operation that begins at a timestamp between thirty-five seconds and forty seconds, and image 718D can be presented for a scrubbing operation that begins at a timestamp between forty seconds and sixty seconds. As such, image 718A is associated with a duration of ten seconds, image 718B is associated with a duration of twenty-five seconds, image 718C is associated with a duration of five seconds, and image 718D is associated with a duration of twenty seconds.

FIG. 8 illustrates an example flowchart showing a process for implementing techniques relating to generating manifests for image presentation during video presentation, according to at least one example. The video presentation engine 910 (FIG. 9) embodied in the computer system 902 (FIG. 9) and/or within the user device 904 (FIG. 9) may perform the process 800. Thus, while the description describes certain portions of the process from the perspectives of the computer system 902 and user device 904, the computer system 902 and the user device 904 may perform other portions of the process.

The process 800 may begin at block 802 by the computer system 902 generating an input to an artificial intelligence model (e.g., image generation model 110 in FIG. 1) based on a set of frames 106 (FIG. 1) of video content. The computer system 902 can receive the set of frames 106 of the video content.

The process 800 may continue at block 804 by the computer system 902 receiving an output of the artificial intelligence model indicating a set of images 114 (FIG. 1)

and durations 116 (FIG. 1). The set of images 114 corresponds to the set of frames 106 and are to be presented during a scrubbing operation associated with a presentation of the video content. The durations are for individual images of the set of images 114. A first image of the set of images 114 is to be presented for a first duration that is different from a second duration that a second image of the set of images is to be presented.

The process 800 may continue at block 806 by the computer system 902 generating a manifest 122 (FIG. 1) including the video content, an indication of the set of images 114, and the durations 116. The manifest 122 includes a first portion associated with the video content, a second portion associated with interactive content that is to be presented in associated with the video content during the presentation of the video content, and a third portion corresponding to targeted content that is to be presented in associated with the video content during the presentation of the video content. The set of images is a first set of images. The first portion is associated with the first set of images, the second portion is associated with a second set of images that are to be presented during the scrubbing operation associated with the interactive content, and the third portion is associated with a third set of images that are to be presented during the scrubbing operation associated with the targeted content.

The process 800 may continue at block 808 by the computer system 902 storing the manifest in a storage location. In some instances, the computer system 902 can determine an updated set of images that are to be presented during the scrubbing operation. The computer system 902 can determine updated durations for presenting individual images of the updated set of images and generate an updated manifest including the video content, an updated indication of the updated set of images, and the updated durations.

The computer system 902 or the user device 904 can receive a request to initiate a beginning of a scrubbing operation during a presentation of video content at the user device. For instance, the user device 904 can receive, via a user interface of the user device 904, a user input 206 (FIG. 2) to initiate a beginning of the scrubbing operation during the presentation of the video content at the user device 904. The user device 904 can determine a timestamp of the video content associated with the beginning of the scrubbing operation. The user device 904 can also receive the manifest 122 associated with the video content and determine, based at least in part on the manifest 122, that the timestamp corresponds to the first image of the set of images 114. The user device 904 (or the computer system 902) can generate a mapping between a timeline of the video content and the set of images 114 based at least in part on the durations 116, determine a point within the timeline corresponding to the timestamp, and determine that the point corresponds to the first image based at least in part on the mapping. The user device 904 can cause presentation of the first image in connection with the scrubbing operation during the presentation of the video content.

The indication of the set of images 114 can indicate a location of an MP4 file that includes the set of images 114. The manifest 122 further indicates a byte range of the MP4 file corresponding to first image. The user device 904 can retrieve, in response to determining the timestamp corresponds to the first image, the first image from the location of the MP4 file based at least in part on the byte range for the first image.

The indication of the set of images 114 can indicate a first location of a first JPEG image corresponding to the first image. The indication of the set of images can further indicate a second location of a second JPEG image corresponding to the second image. The first location is different from the second location.

Additionally or alternatively, the set of images 114 can be stored in tiles. The indication of the set of images 114 indicates a location of the tiles. The user device 904 or the computer system 902 can generate a mapping between a timeline of the video content and the tiles based at least in part on the durations 116. The user device 904 or the computer system 902 can determine a point within the timeline corresponding to the timestamp and determine that the point corresponds to the first image based at least in part on the mapping.

The indication of the set of images 114 can indicate a location of a BIF file that includes the set of images 116. The manifest 122 can further indicate a byte range of the BIF file corresponding to first image. The computer system 902 or the user device 904 can retrieve, in response to determining the timestamp corresponds to the first image, the first image from the location of the BIF file based at least in part on the byte range for the first image.

Figure 9:
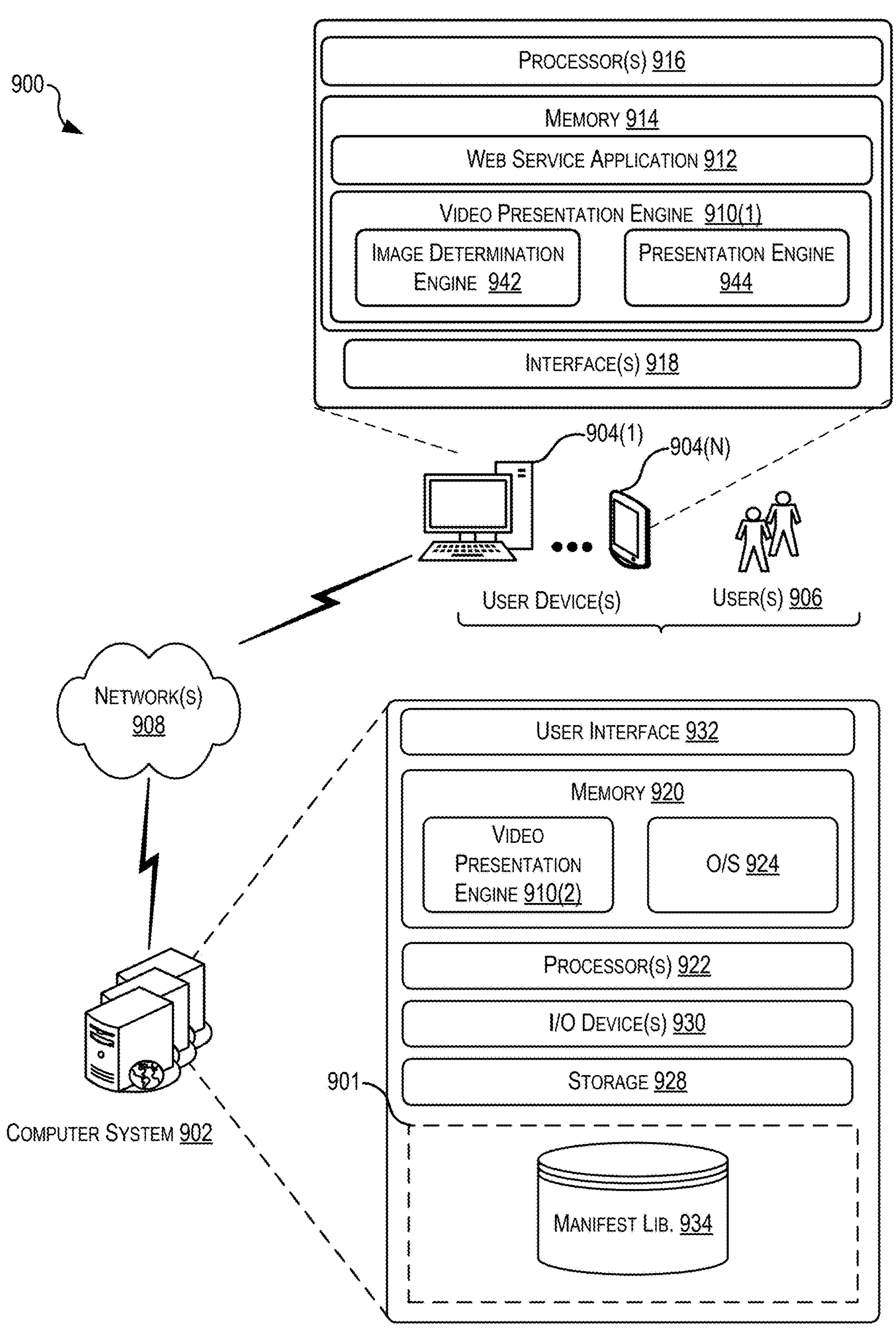
FIG. 9 illustrates an example schematic architecture for implementing techniques relating to generating manifests for image presentation during video presentation, according to at least one example.

FIG. 9 illustrates an example schematic architecture 900 for implementing techniques relating to generating manifests for image presentation during video presentation, according to at least one example. The architecture 900 may include a computer system 902 (e.g., the computer system described herein) in communication with one or more user devices 904(1)-904(N) via one or more networks 908 (hereinafter, "the network 908").

The user device 904 may be operable by one or more users 906 to interact with the computer system 902. The users 906 may be administrators, developers, or others that desire to test or utilize operations of the techniques described herein. The user device 904 may be any suitable type of computing device such as, but not limited to, a tablet, a mobile phone, a smart phone, a network-enabled streaming device (a high-definition multimedia interface ("HDMI") micro-console pluggable device), a personal digital assistant ("PDA"), a laptop computer, a desktop computer, a thin-client device, a tablet computer, etc. For example, the user device 904(1) is illustrated as a desktop computer, while the user device 904(N) is illustrated as an example of a handheld mobile device.

The user device 904 may include a memory 914 and processor(s) 916. In the memory 914 may be stored program instructions that are loadable and executable on the processor(s) 916, as well as data generated during the execution of these programs. Depending on the configuration and type of user device 904, the memory 914 may be volatile (such as random access memory ("RAM")) and/or non-volatile (such as read-only memory (ROM), flash memory, etc.).

In some examples, the memory 914 may include a web service application 912 and a version of a video presentation engine 910 (e.g., 910(1)). The web service application 912 and/or the video presentation engine 910(1) may allow the user 906 to interact with the computer system 902 via the network 908. The user device 904 may also include one or more interfaces 918 to enable communication with other devices, systems, and the like. The video presentation engine 910, whether embodied in the user device 904 or the computer system 902, may be configured to perform the techniques described herein.

The video presentation engine 910 includes an image determination engine 942 and a presentation engine 944. In an example, the video presentation engine 910 can include any other suitable engines, modules, models, and the like.

The image determination engine 942 can manage various tasks related to determining an image to present during a scrubbing operation associated with presentation of video content. In an example, the image determination engine 942 may include one or more artificial intelligence models for determining images that are to be presented for video content. The image determination engine 942 may train the artificial intelligence models, ingest data into the artificial intelligence models, may transmit, or otherwise share output from the artificial intelligence models, and any other suitable tasks. In an example, the image determination engine 942 may be the artificial models, may take the artificial intelligence inputs, and may output the artificial intelligence outputs relating to image determination. The image determination engine 942 may be configured to receive manifests for video content, determine images to present for scrubbing operations based on the manifest, and/or perform other suitable tasks with respect to image data described herein.

The presentation engine 944 can include one or more computer services for causing a presentation of an image based on the outputs generated by the image determination engine 942. The presentation engine 944 may receive outputs of the image determination engine 942, may retrieve image data based on the outputs, may cause presentation of the image data, and any other suitable tasks.

Turning now to the details of the computer system 902, the computer system 902 may include one or more computer system computers, perhaps arranged in a cluster of servers or as a server farm, and may host web service applications. The function of the computer system 902 may be implemented a cloud-based environment such that individual components of the computer system 902 are virtual resources in a distributed environment.

The computer system 902 may include at least one memory 920 and one or more processing units (or processor(s)) 922. The processor 922 may be implemented as appropriate in hardware, computer-executable instructions, software, firmware, or combinations thereof. Computer-executable instruction, software, or firmware implementations of the processor 922 may include computer-executable or machine-executable instructions written in any suitable programming language to perform the various functions described. The memory 920 may include more than one memory and may be distributed throughout the computer system 902. The memory 920 may store program instructions that are loadable and executable on the processor(s) 922, as well as data generated during the execution of these programs. Depending on the configuration and type of memory including the computer system 902, the memory 920 may be volatile (such as RAM and/or non-volatile (such as read-only memory ("ROM"), flash memory, or other memory)). The memory 920 may include an operating system 924 and one or more application programs, modules, or services for implementing the features disclosed herein including at least a version of the video presentation engine 910 (e.g., 910(2)). For example, the video presentation engine 910(2) may perform the functionality described herein.

The computer system 902 may also include additional storage 928, which may be removable storage and/or non-removable storage including, but not limited to, magnetic storage, optical disks, and/or tape storage. The disk drives and their associated computer-readable media may provide non-volatile storage of computer-readable instructions, data structures, program modules, and other data for the computing devices. The additional storage 928, both removable and non-removable, is an example of computer-readable storage media. For example, computer-readable storage media may include volatile or non-volatile, removable, or non-removable media implemented in any suitable method or technology for storage of information such as computer-readable instructions, data structures, program modules, or other data. As used herein, modules, engines, applications, and components may refer to programming modules executed by computing systems (e.g., processors) that are part of the computer system 902 and/or part of the user device 904.

The computer system 902 may also include input/output (I/O) device(s) and/or ports 930, such as for enabling connection with a keyboard, a mouse, a pen, a voice input device, a touch input device, a display, speakers, a printer, or other I/O device.

In some examples, the computer system 902 may also include one or more user interface(s) 932. The user interface 932 may be utilized by an operator, curator, or other authorized user to access portions of the computer system 902. In some examples, the user interface 932 may include a graphical user interface, voice interfaces, web-based applications, programmatic interfaces such as APIs, or other user interface configurations.

The computer system 902 may also include a data store 901. In some examples, the data store 901 may include one or more databases, data structures, or the like for storing and/or retaining information associated with the computer system 902 and which, in some examples, may be accessible by the user devices 904. The video presentation engine 910 is communicatively coupled (e.g., via a wired connection or a wireless connection) to the data store 901. The data store 901 includes a manifest library 934. In an example, the data store 901 can include any other suitable data, databases, libraries, and the like.

Figure 10:
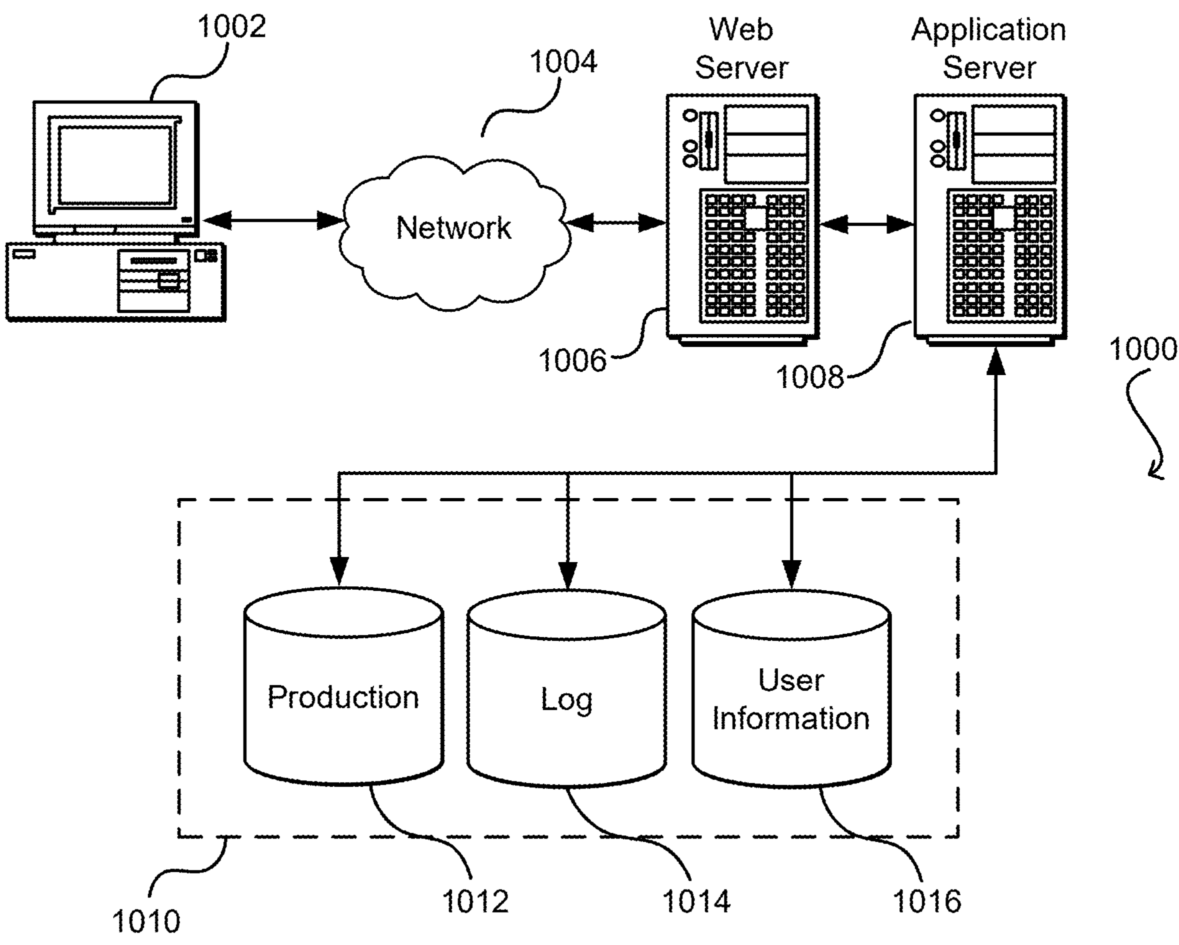
FIG. 10 illustrates an environment in which various embodiments can be implemented.

FIG. 10 illustrates aspects of an example environment 1000 for implementing aspects in accordance with various embodiments. As will be appreciated, although a Web-based environment is used for purposes of explanation, different environments may be used, as appropriate, to implement various embodiments. The environment includes an electronic client device 1002, which can include any appropriate device operable to send and receive requests, messages, or information over an appropriate network 1004 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 1006 for receiving requests and serving content in response thereto, although for other networks an alternative device serving a similar purpose could be used as would be apparent to one of ordinary skill in the art.

The illustrative environment includes at least one application server 1008 and a data store 1010. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio, and/or video to be transferred to the user, which may be served to the user by the Web server in the form of HyperText Markup Language ("HTML"), Extensible Markup Language ("XML"), or another appropriate structured language in this example. The handling of all requests and responses, as well as the delivery of content between the client device 1002 and the application server 1008, can be handled by the Web server. It should be understood that the Web and application servers are not required and are merely example components, as structured code discussed herein can be executed on any appropriate device or host machine as discussed elsewhere herein.

The data store 1010 can include several separate data tables, databases or other data storage mechanisms and media for storing data relating to a particular aspect. For example, the data store illustrated includes mechanisms for storing production data 1012 and user information 1016, which can be used to serve content for the production side. The data store also is shown to include a mechanism for storing log data 1014, which can be used for reporting, analysis, or other such purposes. It should be understood that there can be many other aspects that may need to be stored in the data store, such as for page image information and to access right information, which can be stored in any of the above listed mechanisms as appropriate or in additional mechanisms in the data store 1010. The data store 1010 is operable, through logic associated therewith, to receive instructions from the application server 1008 and obtain, update or otherwise process data in response thereto. In one example, a user might submit a search request for a certain type of item. In this case, the data store might access the user information to verify the identity of the user and can access the catalog detail information to obtain information about items of that type. The information then can be returned to the user, such as in a results listing on a Web page that the user is able to view via a browser on the user device 1002. Information for a particular item of interest can be viewed in a dedicated page or window of the browser.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 10. Thus, the depiction of the system 1000 in FIG. 10 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers, and business application servers. The server(s) also may be capable of executing programs or scripts in response to requests from user devices, such as by executing one or more Web applications that may be implemented as one or more scripts or programs written in any programming language, such as Java®, C, C#, or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired)), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory or other memory technology, Compact Disc Read-Only Memory ("CD-ROM"), digital versatile disk (DVD), or other optical storage, magnetic cassettes, magnetic tape, magnetic disk storage, or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:

receiving a set of frames of video content;

generating an input to an artificial intelligence model based at least in part on the set of frames;

receiving, based at least in part on the input, an output of the artificial intelligence model indicating a set of images corresponding to the set of frames that are to be presented during a scrubbing operation associated with a presentation of the video content, wherein the output further indicates durations for individual images of the set of images, and wherein a first image of the set of images is to be presented for a first duration that is different from a second duration that a second image of the set of images is to be presented;

generating a manifest including the video content, an indication of the set of images, and the durations;

receiving, via a user interface of a user device, a user input to initiate a beginning of the scrubbing operation by adjusting a timeline feature of the user interface during the presentation of the video content at the user device;

determining a timestamp of the video content associated with the beginning of the scrubbing operation;

determining, based at least in part on the manifest, that the timestamp corresponds to the first image; and causing presentation of the first image in connection with the scrubbing operation and for the first duration relative to the timeline feature during the presentation of the video content.

2. The computer-implemented method of claim 1, wherein the manifest includes a first portion associated with the video content, a second portion associated with interactive content that is to be presented in associated with the video content during the presentation of the video content, and a third portion corresponding to targeted content that is to be presented in associated with the video content during the presentation of the video content.

3. The computer-implemented method of claim 2, wherein the set of images is a first set of images, wherein the first portion is associated with the first set of images, the second portion is associated with a second set of images that are to be presented during the scrubbing operation associated with the interactive content, and the third portion is associated with a third set of images that are to be presented during the scrubbing operation associated with the targeted content.

4. The computer-implemented method of claim 1, further comprising:

generating a mapping between a timeline of the video content and the set of images based at least in part on the durations;

determining a point within the timeline corresponding to the timestamp; and determining that the point corresponds to the first image based at least in part on the mapping.

5. One or more non-transitory computer-readable media comprising computer-executable instructions that, when executed by one or more computer systems, cause the one or more computer systems to perform operations comprising:

generating an input to an artificial intelligence model based at least in part on a set of frames of video content;

receiving, based at least in part on the input, an output of the artificial intelligence model indicating a set of images corresponding to the set of frames that are to be presented during a scrubbing operation associated with presentation of the video content, and wherein the output further indicates durations for individual images of the set of images, and wherein a first image of the set of images is to be presented for a first duration that is different from a second duration that a second image of the set of images is to be presented, and wherein the scrubbing operation involves adjusting a timeline feature of a user interface of a user device;

generating a manifest including the video content, an indication of the set of images, and the durations; and storing the manifest in a storage location such that the set of images are configured to be presented in connection with the scrubbing operation and for the durations relative to the timeline feature during presentation of the video content based at least in part on the manifest.

6. The one or more non-transitory computer-readable media of claim 5, wherein the operations further comprise:

receiving, from the user device, information that represents a user selection to initiate a beginning of the scrubbing operation during the presentation of the video content at the user device;

determining a timestamp of the video content associated with the beginning of the scrubbing operation;

determining, based at least in part on the manifest, that the timestamp corresponds to the first image; and causing presentation of the first image in connection with the scrubbing operation during the presentation of the video content.

7. The one or more non-transitory computer-readable media of claim 5, wherein the indication of the set of images indicates a location of an MP4 file that includes the set of images, and wherein the manifest further indicates a byte range of the MP4 file corresponding to first image.

8. The one or more non-transitory computer-readable media of claim 7, wherein the operations further comprise:

receiving, from the user device, information that represents a user selection to initiate a beginning of the scrubbing operation during the presentation of the video content at the user device;

determining a timestamp of the video content associated with the beginning of the scrubbing operation; and retrieving, in response to determining the timestamp corresponds to the first image, the first image from the location of the MP4 file based at least in part on the byte range for the first image.

9. The one or more non-transitory computer-readable media of claim 5, wherein the operations further comprise:

generating a mapping between a timeline of the video content and the set of images based at least in part on the durations.

10. The one or more non-transitory computer-readable media of claim 9, wherein the operations further comprise:

receiving, from the user device, information that represents a user selection to initiate a beginning of the scrubbing operation during the presentation of the video content at the user device;

determining a timestamp of the video content associated with the beginning of the scrubbing operation;

determining a point within the timeline corresponding to the timestamp; and determining that the point corresponds to the first image based at least in part on the mapping.

11. The one or more non-transitory computer-readable media of claim 5, wherein the operations further comprise:

determining an updated set of images that are to be presented during the scrubbing operation;

determining updated durations for presenting individual images of the updated set of images; and generating an updated manifest including the video content, an updated indication of the updated set of images, and the updated durations.

12. The one or more non-transitory computer-readable media of claim 5, wherein the manifest includes a first portion associated with the video content, a second portion associated with interactive content that is to be presented in associated with the video content during the presentation of the video content, and a third portion corresponding to targeted content that is to be presented in associated with the video content during the presentation of the video content.

13. A system, comprising:

one or more memories configured to store computer-executable instructions;

one or more processors configured to access the one or more memories and execute the computer-executable instructions to at least:

receive a request to initiate a beginning of a scrubbing operation by adjusting a timeline feature of a user interface during a presentation of video content at a user device;

determine a timestamp of the video content associated with the beginning of the scrubbing operation;

receive a manifest associated with the video content, wherein the manifest indicates a set of images corresponding to a set of frames of the video content that are to be presented during the scrubbing operation associated with the presentation of the video content, wherein the manifest further indicates durations for individual images of the set of images, and wherein a first image of the set of images is to be presented for a first duration that is different from a second duration that a second image of the set of images is to be presented;

determine, based at least in part on the manifest, that the timestamp corresponds to the first image of the set of images; and cause presentation of the first image in connection with the scrubbing operation and for the first duration relative to the timeline feature during the presentation of the video content.

14. The system of claim 13, wherein the indication of the set of images indicates a first location of a first JPEG image corresponding to the first image.

15. The system of claim 14, wherein the indication of the set of images further indicates a second location of a second JPEG image corresponding to the second image, wherein the first location is different from the second location.

16. The system of claim 13, wherein the set of images are stored in tiles, and wherein the indication of the set of images indicates a location of the tiles.

17. The system of claim 16, wherein the one or more processors are configured to access the one or more memories and execute additional computer-executable instructions to at least:

generate a mapping between a timeline of the video content and the tiles based at least in part on the durations.

18. The system of claim 17, wherein the one or more processors are configured to access the one or more memories and execute additional computer-executable instructions to at least:

determine a point within the timeline corresponding to the timestamp; and determine that the point corresponds to the first image based at least in part on the mapping.

19. The system of claim 13, wherein the indication of the set of images indicates a location of a BIF file that includes the set of images, and wherein the manifest further indicates a byte range of the BIF file corresponding to first image.

20. The system of claim 19, wherein the one or more processors are configured to access the one or more memories and execute additional computer-executable instructions to at least:

retrieve, in response to determining the timestamp corresponds to the first image, the first image from the location of the BIF file based at least in part on the byte range for the first image.

* * * * *